US011372788B2

(12) United States Patent
Hansing et al.

(10) Patent No.: US 11,372,788 B2
(45) Date of Patent: Jun. 28, 2022

(54) BUS ARRANGEMENT AND METHOD FOR OPERATING A BUS ARRANGEMENT

(71) Applicant: Eaton Intelligent Power Limited, Dublin (IE)

(72) Inventors: Matthias Hansing, Bad Honnef (DE); Franz Heller, Sankt Augustin (DE); Peter Thiessmeier, Wachtberg (DE)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/908,749

(22) Filed: Jun. 23, 2020

(65) Prior Publication Data

US 2020/0320027 A1 Oct. 8, 2020

Related U.S. Application Data

(63) Continuation of application No. 15/781,528, filed as application No. PCT/EP2016/079835 on Dec. 6, 2016, now Pat. No. 10,733,120.

(30) Foreign Application Priority Data

Dec. 7, 2015 (DE) .................... 10 2015 121 292.7

(51) Int. Cl.
*G06F 13/20* (2006.01)
*H04L 12/12* (2006.01)
*H04L 12/40* (2006.01)
*G06F 13/40* (2006.01)

(52) U.S. Cl.
CPC .......... *G06F 13/20* (2013.01); *G06F 13/4068* (2013.01); *H04L 12/12* (2013.01); *H04L 12/40169* (2013.01); *Y02D 30/50* (2020.08)

(58) Field of Classification Search
CPC ....................................................... G06F 8/65
See application file for complete search history.

(56) References Cited

U.S. PATENT DOCUMENTS 5,340,340 A * 8/1994 Hastings ................. G06F 1/181
312/223.1
5,875,308 A * 2/1999 Egan .................. G06F 13/4081
710/302
6,418,492 B1 * 7/2002 Papa ................... G06F 13/4027
710/302

(Continued)

FOREIGN PATENT DOCUMENTS

DE 3736081 A1 5/1989
DE 4340048 A1 6/1995

(Continued)

*Primary Examiner* — Henry Tsai
*Assistant Examiner* — Juanito Borromeo
(74) *Attorney, Agent, or Firm* — Leydig, Voit & Mayer, Ltd.

(57) ABSTRACT

A bus arrangement includes a coordinator, a first subscriber, a first subscriber arrangement, and a bus. The first subscriber arrangement has a second subscriber. The bus couples the coordinator with the first subscriber and the second subscriber. The first subscriber is arranged between the coordinator and the second subscriber on the bus. The bus arrangement is configured such that the first subscriber arrangement can be decoupled from the bus in an operating phase, and such that the first subscriber cannot be decoupled from the bus in the operating phase.

20 Claims, 6 Drawing Sheets

(56) References Cited

U.S. PATENT DOCUMENTS

| | | | |
|---|---|---|---|
| 6,473,839 | B1 | 10/2002 | Kremser et al. |
| 6,813,671 | B1 | 11/2004 | Ikeda |
| 7,949,376 | B2 | 5/2011 | Maekawa |
| 8,253,960 | B2 | 8/2012 | Kreppold et al. |
| 8,488,503 | B2 | 7/2013 | Won et al. |
| 8,823,520 | B2 * | 9/2014 | Ly .......................... H04Q 9/00 340/540 |
| 9,240,686 | B2 | 1/2016 | Bajjuri et al. |
| 2012/0119902 | A1 | 5/2012 | Patro et al. |
| 2013/0024706 | A1 | 1/2013 | Katar et al. |

FOREIGN PATENT DOCUMENTS

| | | |
|---|---|---|
| DE | 102006018871 A1 | 10/2007 |
| DE | 112010005421 T5 | 1/2013 |
| EP | 1587242 A2 | 10/2005 |
| EP | 2375632 A1 | 10/2011 |
| EP | 2426865 A2 | 3/2012 |

\* cited by examiner

FIG 1

BUS ARRANGEMENT AND METHOD FOR OPERATING A BUS ARRANGEMENT

CROSS-REFERENCE TO PRIOR APPLICATIONS

This application is a continuation of U.S. patent application Ser. No. 15/781,528, filed on Jun. 5, 2018, which is a U.S. National Stage Application under 35 U.S.C. § 371 of International Application No. PCT/EP2016/079835 filed on Dec. 6, 2016, and claims benefit to German Patent Application No. DE 10 2015 121 292.7 filed on Dec. 7, 2015. The International Application was published in German on Jun. 15, 2017 as WO 2017/097737 A1 under PCT Article 21(2). The entire contents of each of which are hereby incorporated by reference herein.

FIELD

The present invention relates to a bus arrangement and to a method for operating a bus arrangement.

BACKGROUND

A bus arrangement can be used in automation technology, for example. A bus arrangement typically has one coordinator and a plurality of subscribers. The subscribers can be embodied as actuators or sensors. The actuators can be switching devices such as contactors, motor starters and circuit breakers, command devices and frequency converters.

SUMMARY

In an embodiment, the present invention provides a bus arrangement that includes a coordinator; a first subscriber; a first subscriber arrangement with a second subscriber; and a bus. The bus couples the coordinator with the first subscriber and the second subscriber. The first subscriber is arranged between the coordinator and the second subscriber on the bus. The bus arrangement is configured such that the first subscriber arrangement can be decoupled from the bus in an operating phase, and such that the first subscriber cannot be decoupled from the bus in the operating phase.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

An embodiment of the present invention provides a bus arrangement and a method for operating a bus arrangement in which subscribers are coupled in different manners with a bus.

In one embodiment, a bus arrangement includes a coordinator, a first subscriber, a first subscriber line with a second subscriber, and a bus. The bus couples the coordinator with the first and second subscribers. The first subscriber is arranged between the coordinator and the second subscriber on the bus. Here, the bus arrangement is designed (configured) such that the first subscriber arrangement can be decoupled from the bus in an operating phase.

In one embodiment, the bus arrangement is not designed (configured) such that the first subscriber can be decoupled from the bus in an operating phase.

The coordinator advantageously continues the operating phase even after decoupling of the first subscriber arrangement.

In one embodiment, the first subscriber arrangement and thus the second subscriber can be decoupled and coupled in an operating phase. The first subscriber arrangement and the second subscriber are thus hot-pluggable. In contrast, the first subscriber cannot be decoupled or coupled in an operating phase. The first subscriber is not hot-pluggable.

The first subscriber arrangement can also be referred to as a drawer.

In one embodiment, the coordinator outputs a first error message and/or puts the bus device in a secure state if the first subscriber is active at a first timepoint during an operating phase and has been removed or is inactive at a second timepoint during the same operating phase. A secure state can be achieved by switching off all subscribers of the bus arrangement, for example. Here, the second timepoint comes after the first timepoint.

In one embodiment, the coordinator registers the decoupling of the first subscriber arrangement if the second subscriber is active at a first timepoint during an operating phase and has been removed or is inactive at a second timepoint during the same operating phase. Here, the second timepoint comes after the first timepoint. The coordinator registers the decoupling of the first subscriber arrangement in a non-volatile semi-permanent memory of the coordinator, for example.

In one embodiment, the first subscriber and the first subscriber arrangement are mechanically intercoupled such that the first subscriber arrangement can be decoupled from and coupled with the bus without removal of the first subscriber and the first subscriber cannot be decoupled from and coupled with the bus without removal of the first subscriber arrangement. This prevents the first subscriber arrangement from being connected to the bus without the first subscriber being connected to the bus.

The first subscriber can be embodied as a control branch.

The first subscriber can include a power supply that is independent from the coordinator and supply the first subscriber arrangement with electric power.

The first subscriber can be embodied in such a way that it is difficult to separate mechanically from the bus arrangement.

In an alternative embodiment, the coordinator places different flags in the non-volatile semi-permanent memory for the first and second subscribers. The flags indicate decouplability and couplability in an operating phase. The flags prevent the first subscriber arrangement from being connected to the bus and activated without the first subscriber being connected to the bus.

In one embodiment, the first subscriber includes a first non-volatile permanent memory in which a first serial number is stored. Moreover, the second subscriber includes a second non-volatile permanent memory in which a second serial number is stored.

In one embodiment, in a configuration phase, the coordinator assigns the first subscriber a first subscriber address and the second subscriber a second subscriber address. In addition, the coordinator also retrieves the first and second serial numbers and stores them in a non-volatile semi-permanent memory of the coordinator. The coordinator can store the respective serial number for each subscriber address. In the non-volatile semi-permanent memory, the first subscriber address is associated with the first serial number and the second subscriber address is associated with the second serial number, and so on. A subscriber address can also be referred to as a subscriber number.

Advantageously, the first and second subscribers have unique serial numbers. Since the first subscriber differs from the second subscriber based on the respective serial number, it is possible to address the subscribers using the serial numbers. The first serial number is a globally unique number that is stored in the first subscriber during the production process of the first subscriber. Accordingly, the second serial number is also a unique number that is stored in the second subscriber during the production process of the second subscriber.

In one embodiment, the first subscriber can be addressed using the first subscriber address and the first serial number. The second subscriber can only be addressed using the second subscriber address and not using the second serial number.

In one embodiment, the non-volatile semi-permanent memory of the coordinator remanently stores the first and second serial numbers. The non-volatile semi-permanent memory of the coordinator thus continues to store the first and second serial numbers even if the power supply of the coordinator is interrupted.

In one embodiment, the configuration phase is part of an operating phase. The operating phase is followed by a shut-down phase and then another operating phase, which begins with a restart phase. Subsequently, additional operating phases, each of which has a restart phase at the beginning, can alternate with shut-down phases. The restart phase thus follows the configuration phase. The coordinator can also receive a command—via a switch of the coordinator, for example—to start another operating phase with an additional configuration phase.

In one embodiment, in a restart phase following the configuration phase, the coordinator establishes a connection to the first and second subscribers, retrieves the first and second serial numbers, and compares the retrieved first and second serial numbers with first and second serial numbers stored in the non-volatile semi-permanent memory of the coordinator. For example, the coordinator can output a signal with an error message if one or both retrieved serial numbers deviate from the stored serial numbers. With this signal, the coordinator can inform an operator of the bus arrangement or a higher-level control of the bus arrangement that one of the subscribers has been exchanged.

A shut-down phase precedes the restart phase. Exchanging the first or second subscriber changes one of the serial numbers. The coordinator can thus advantageously determine whether, for example, a subscriber has been exchanged during the shut-down phase before the restart phase.

In one embodiment, the exchanging of the first subscriber during a shut-down phase is only permitted if an additional configuration phase is carried out after the exchange.

In one embodiment, the first subscriber is exchanged for another first subscriber during a shut-down phase that lies between the configuration phase and the additional configuration phase. In the additional configuration phase, the coordinator establishes a connection to the additional first subscriber, retrieves a serial number of the additional first subscriber, and stores it in the non-volatile semi-permanent memory in place of the first serial number. The additional first subscriber thus takes the place of the first subscriber.

In one embodiment, the coordinator includes a switch. The coordinator carries out the additional configuration phase after actuation of the switch.

In one embodiment, the coordinator can be put into an exchange operating phase or exchange mode or replacement mode. If the coordinator is in the exchange operating phase, then the coordinator establishes a connection to the second subscriber, retrieves the second serial number, and stores the retrieved second serial number in the non-volatile semi-permanent memory in place of the previously stored second serial number. For example, in an exchange operating phase, the first subscriber cannot be exchanged, since that occurs exclusively in an additional configuration phase. In the exchange operating phase, however, it is possible for the first or another subscriber arrangement or individual subscribers to be exchanged in the first or another subscriber arrangement.

In one embodiment, the bus arrangement includes an additional subscriber that is connected to the bus between the coordinator and the first subscriber in the configuration phase and removed after the configuration phase. In a restart phase after the configuration phase, the coordinator addresses the first subscriber using the first serial number and assigns it a first subscriber address.

Advantageously, the gap that results from the removal of the additional subscriber is filled by addressing the first subscriber with its first serial number.

The additional subscriber can be part of an additional subscriber arrangement. The additional subscriber can be the direct predecessor of the first subscriber.

In one embodiment, the first subscriber activates the second subscriber in the restart phase. The coordinator assigns the second subscriber address to the second subscriber and retrieves the second serial number. If the retrieved second serial number matches the second serial number stored in the non-volatile semi-permanent memory of the coordinator, the coordinator activates the second subscriber. Otherwise, the coordinator outputs an error message and/or deactivates the second subscriber.

In one embodiment, the bus includes a first signal line that couples the first subscriber and the coordinator, and a bus line that connects the second subscriber to the first subscriber. The bus includes at least one bus line that connects the coordinator to the first and second subscribers.

In one embodiment, in the configuration phase, the coordinator activates the first subscriber via the first signal line and transmits a telegram containing a first subscriber address via the at least one bus line to all subscribers and thus to the first and the second subscribers. The first subscriber stores the first subscriber address in a first volatile memory of the first subscriber. Advantageously, only the first subscriber stores the first subscriber address provided via the at least one bus line, since only the first subscriber is activated. Such a telegram that is sent to all subscribers via the bus line can also be referred to as a broadcast message. Since the first subscriber now continues to store the first subscriber address in the first volatile memory in the operating phase that was initiated by the configuration phase, it can be addressed by means of the first subscriber address. The activation of the first subscriber can be done directly by the coordinator or, if an additional or further subscribers are arranged between the coordinator and the first subscriber, via the subscriber preceding the first subscriber.

In one embodiment, the first subscriber activates the second subscriber via the second signal line in the configuration phase. Furthermore, the coordinator transmits a message containing a second subscriber address to all subscribers via the at least one bus line. The second subscriber stores the second subscriber address in a second volatile memory of the second subscriber. Advantageously, only the second subscriber stores the second subscriber address, since only the second subscriber is activated at this point in time.

In one embodiment, the coordinator detects a malfunctioning of the first and/or the second subscriber and stores the information about the malfunctioning of the first and/or the second subscriber in the non-volatile semi-permanent memory. The coordinator registers the malfunctioning subscribers as having malfunctioned. The malfunctioning of a subscriber can be triggered by a defect in the subscriber, for example, or as a result of the removal of the subscriber and thus the absence of the subscriber. Both the associated serial number as well as information regarding whether the subscriber is down or whether it is active is thus stored in the non-volatile semi-permanent memory of the coordinator for each subscriber address.

In one embodiment, the coordinator can reactivate one or more subscribers that malfunctioned. The activation can be performed in the forward direction as well as in the reverse direction. The subscribers of the first subscriber arrangement, such as the second subscriber, for example, can be reactivated automatically by the coordinator.

In one embodiment, however, the first subscriber cannot be automatically activated by the coordinator after a malfunction. In the event of the malfunctioning of the first subscriber, the coordinator outputs a signal with a first error message, for example, and/or puts the bus arrangement into a secure state.

In one embodiment, for example, the second subscriber is down and the first subscriber is functional. After the storage of the information regarding the malfunctioning of the second subscriber, the coordinator can instruct the first subscriber to activate the second subscriber via the at least one bus line. The coordinator can transmit a telegram containing the second subscriber address to all subscribers. Since the second subscriber is activated, the second subscriber stores the second subscriber address in the second volatile memory. The second subscriber then confirms the activation to the coordinator. The coordinator retrieves the serial number of the second subscriber and compares the retrieved serial number with the second serial number stored in the non-volatile semi-permanent memory. If the two serial numbers match, the coordinator can register the information about the operability of the second subscriber in the non-volatile semi-permanent memory.

Advantageously, the coordinator attempts to reincorporate the second subscriber into the bus operation. This prevents another subscriber from being connected to the bus in the place of the second subscriber. The security of the automation system is thus enhanced.

In one embodiment, the coordinator detects the malfunctioning of the additional subscriber and stores the information regarding the malfunctioning of the additional subscriber in the non-volatile semi-permanent memory. The additional subscriber is the direct predecessor of the first subscriber on the bus. After the storage of the information regarding the malfunctioning of the additional subscriber, the coordinator can direct a telegram to the serial number of the additional subscriber via the at least one bus line and thus instruct the additional subscriber to activate the first subscriber. The first subscriber confirms the activation to the coordinator.

For example, the coordinator can transmit a telegram that is addressed to the serial number of the additional subscriber and contains the subscriber address of the additional subscriber. Since the second subscriber is addressed via its serial number, the additional subscriber stores its subscriber address in a volatile memory. The coordinator can store the information regarding the operability of the additional subscriber in the non-volatile semi-permanent memory.

Advantageously, the coordinator attempts to reincorporate the additional subscriber into the bus operation. However, it is only reintegrated into the bus operation if its geographical position on the bus has been identified with the aid of the first subscriber. This prevents some other subscriber from being connected to the bus in the place of the additional subscriber. The security of the automation system is thus enhanced. The coordinator performs backward addressing of the additional subscriber via the first subscriber.

In one embodiment, the first signal line connects the first subscriber to the coordinator. The first subscriber and the coordinator are thus directly and permanently connected to one another via the first signal line.

In one embodiment, the second subscriber is directly and permanently connected to the first subscriber via the second signal line. The second subscriber is not directly connected to the first signal line. The second subscriber is exclusively connected to the first signal line via the first subscriber. Accordingly, the coordinator is not directly connected to the second signal line. The coordinator is coupled with the second signal line via the first subscriber.

The coordinator as well as the first subscriber and the second subscriber are directly connected to the at least one bus line.

In one embodiment, the at least one bus line of the bus is embodied as exactly one bus line.

In an alternative embodiment, the bus has the at least one bus line as well as an additional bus line. Thus, the bus has exactly two bus lines, namely a first and a second bus line. The first and second bus lines can be operated according to the TIA/EIA-485 A standard, also called EIA-485 or RS-485.

In one embodiment, the bus arrangement includes one or more additional subscribers, which are connected to the at least one bus line. An additional subscriber can be connected to the second subscriber via a third signal line. However, the additional subscriber(s) can also be arranged between the coordinator and the first subscriber, for example.

In one embodiment, at least one of the subscribers is embodied as an actuator, measuring device, or sensor. The actuator can be a switching device (such as a contactor, a motor starter, or a circuit breaker), a final controlling device, a command device, a signaling device, a control unit (controller), or a frequency converter.

In one embodiment, the coordinator compares the first serial number stored in the non-volatile semi-permanent memory with the second serial number stored in this memory. The coordinator provides a signal depending on the result of the comparison. The signal thus represents information regarding whether the two serial numbers are identical. If the serial numbers are identical, a fault condition is present.

In the event that the bus arrangement includes the first and the second subscriber as well as an additional subscriber with an additional serial number or a plurality of additional subscribers with a plurality of additional serial numbers, the coordinator compares the first and second serial numbers and the additional serial number(s) with one another. The coordinator provides the signal representing the information that at least two serial numbers are identical.

The first and second non-volatile permanent memories of the subscribers and a non-volatile permanent memory of the coordinator can, for example, be memories such as a read-only memory, abbreviated as ROM, a programmable read-only memory, abbreviated as PROM, or a one-time programmable module—OTP module for short.

A first and a second non-volatile semi-permanent memory of the subscribers and the non-volatile semi-permanent memory of the coordinator can, for example, be memories such as electrically erasable programmable read-only memory, abbreviated as EEPROM, or a flash EEPROM. The first and second non-volatile semi-permanent memories of the subscribers and the non-volatile semi-permanent memory of the coordinator do not lose the content of their memory in a shut-down phase.

The first and second volatile memories of the subscribers and a volatile memory of the coordinator can be embodied as random access memory, abbreviated as RAM, or flash memory, for example. The RAM can be embodied as Dynamic Random Access Memory, abbreviated DRAM, or Static Random Access Memory, abbreviated SRAM. The first and second volatile memories and volatile memory of the coordinator lose the content of their memory in the shut-down phase.

In an embodiment, a method for operating a bus arrangement includes the steps: A first subscriber arrangement is decoupled from a bus in an operating phase. A coordinator continues to operate the bus arrangement. The bus arrangement includes the coordinator, the bus, the first subscriber, and the first subscriber arrangement with a second subscriber. The bus couples the coordinator with the first and second subscribers. The first subscriber is arranged between the coordinator and the second subscriber on the bus.

Advantageously, the first subscriber arrangement can be decoupled during ongoing operation. Advantageously, the bus arrangement can have an exchange phase or exchange mode ("replacement mode").

In one embodiment, when a first subscriber disconnects from the bus in an operating phase, the coordinator outputs a first error message and/or puts the bus arrangement into a secure state.

In one embodiment, the first subscriber arrangement is embodied as a drawer or sliding box. The bus arrangement is constructed in a cabinet, such as a control cabinet. The first subscriber arrangement can be pulled out and reinserted into the cabinet like a drawer or sliding box.

In one embodiment, it is possible to exchange the first subscriber arrangement both online and offline. No reconfiguration is necessary for the exchange. A configuration phase is not required for the exchange. Subscriber arrangements behind one or more subscriber arrangements pulled at independent locations can also rejoin the bus after a power-up.

In one embodiment, the coordinator can address the first subscriber and the second subscriber in the first subscriber arrangement by subscriber address and serial number. The subscriber address is assigned to a unique hardware serial number.

In one embodiment, the coordinator and subscribers form a series connection or chain that can be referred to as a daisy chain. The coordinator and the subscribers thus form a daisy chain arrangement or a daisy chain bus. The coordinator and the subscribers are connected in series via the signal lines. The first subscriber can be connected directly to the coordinator. The other subscribers are each connected to their predecessors.

Advantageously, subscribers can also be incorporated behind a daisy-chain signal gap without confusion. The first subscriber and, optionally, additional subscribers are installed in a geographically fixed manner and can also be used as a starting point for backward addressing.

The practicality of the automatic addressing of subscribers in a bus system is advantageously improved by the bus arrangement and method. Automatic addressing offers a number of possibilities. For instance, a drawer that groups at least two subscribers together geographically in an ascending address sequence can be exchanged not only online but also offline without the need for the arrangement of a reconfiguration by the coordinator. All drawers behind drawers that are pulled at independent locations can also reconnect after a power-up.

The bus arrangement can also be referred to as a bus system. The bus arrangement can carry out an addressing process by daisy chain and the unique serial number, thus enabling the correct positioning of a subscriber on the bus to be checked during a restart.

Each time the bus arrangement is first powered up, a daisy chain procedure is used. All subscribers on the bus are addressed by the coordinator with an ascending address sequence. In this method, a unique serial number that is stored on an integrated circuit that carries out the bus communication, among other things, is retrieved by each bus subscriber. A globally unique number is stored on this integrated circuit during the production process. The integrated circuit can be embodied as an application-specific integrated circuit, abbreviated as ASIC. The integrated circuit can include the transceiver and non-volatile permanent memory of the subscriber. Moreover, a device identity (vendor, device) is read out, indicating the type of device (e.g. Eaton, switch, 200 amperes, type number). The addressing procedure ends at the first missing subscriber or at the last possible subscriber to be addressed. The number of associated unique serial numbers of each addressed subscriber is remanently stored by the coordinator together with its subscriber address.

By means of this method, bus segments, such as subscriber arrangements, for example, can be switched off, switched on again, and also exchanged in a dedicated exchange operating mode. The daisy chain represents the geographical position, and the stored device identity (vendor, device) can be used for the replacement of the device in exchange operating mode. The new serial number of the exchanged devices or subscribers are then exchanged in the remanent configuration of the coordinator.

For example, when the coordinator restarts via the daisy chain, the hardware serial number of a subscriber that was identified during the initial configuration is verified using the serial number stored remanently in the coordinator. This prevents misaddressing of a subscriber that was inserted in the incorrect place, for example. All serial numbers in the bus array are checked in order to avoid duplicate addressing.

If one or more subscribers are not recognized, e.g. due to an interruption of the daisy chain (e.g. in the event of missing or faulty subscribers), addressing can be continued using the unique hardware serial number at the first subscriber or another non-exchangeable subscriber. This method is also used as an option in a subscriber arrangement during operation in the event of the malfunctioning of subscriber arrangements or subscribers in a subscriber arrangement and the rejoining of subscriber arrangements or subscribers.

The invention is explained below in further detail on the basis of several exemplary embodiments with reference to the figures. Components or functional units having the same function and/or effect bear the same reference numerals. Insofar as components or functional units have matching functions, a description thereof will not be repeated for each one of the figures.

Figure 1:
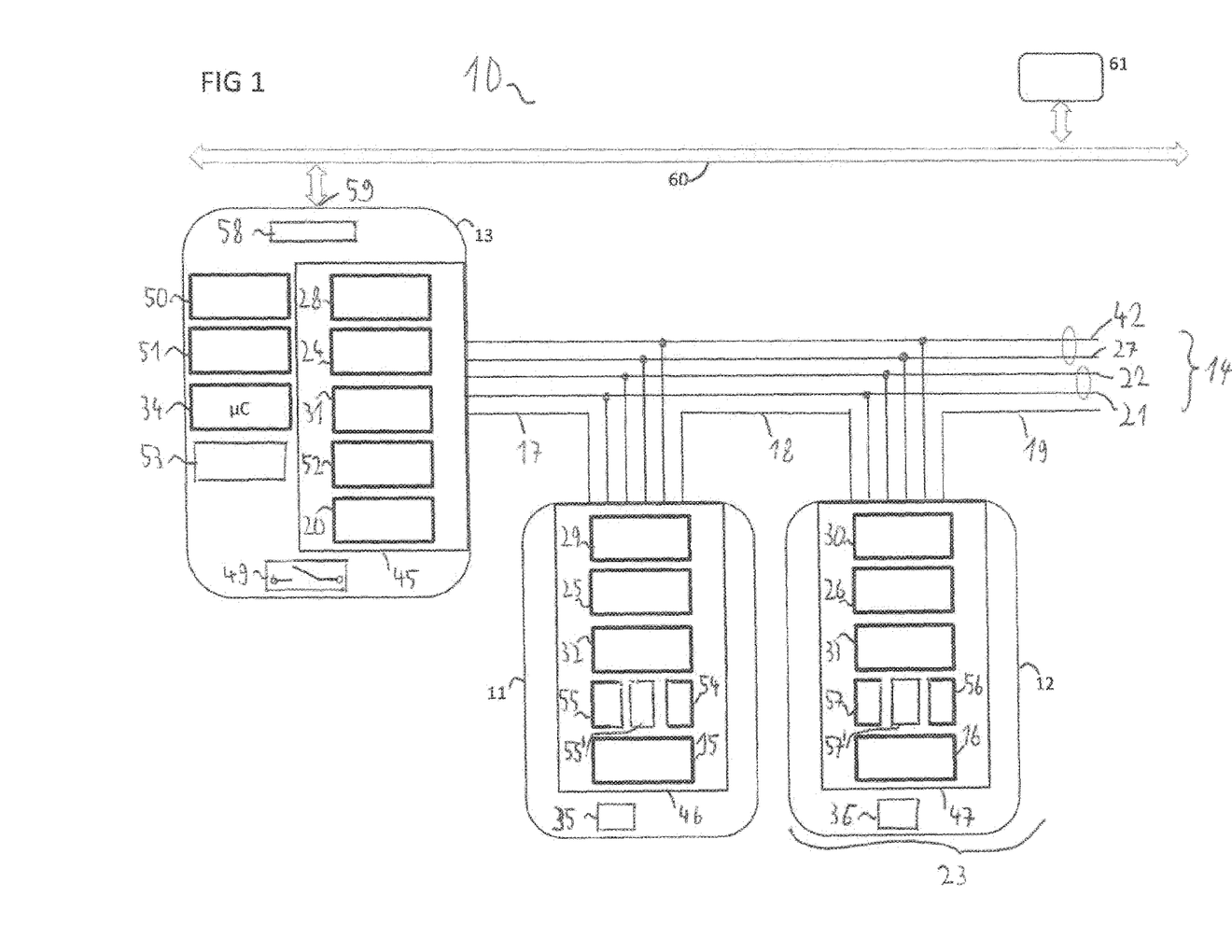
FIGS. 1 and 2 illustrate embodiments of a bus arrangement.

FIG. 1 shows an exemplary embodiment of a bus arrangement 10 that includes a first and a second subscriber 11, 12, a coordinator 13, and a bus 14. The coordinator 13 is connected to the first and second subscribers 11, 12 via the bus 14. The first and second subscribers 11, 12 each have a processor core 15, 16. The bus 14 includes a first signal line 17, which connects a terminal of the coordinator 13 to a terminal of the first subscriber 11 and thereby connects to a terminal of the processor core 15 of the first subscriber 11, for example. The first signal line 17 is not connected directly to the second or additional subscriber 12. For the sake of clarity, the lines in the coordinator 13 and in the first and second subscribers 11, 12 are not shown.

Furthermore, the bus 14 includes a second signal line 18, which connects a terminal of the first subscriber 11 to a terminal of the second subscriber 12. For example, the second signal line 18 connects the processor core 15 of the first subscriber 11 to the processor core 16 of the second subscriber 12. In addition, the bus 14 may include a third signal line 19 connecting a terminal of the second subscriber 12 to a third subscriber (not shown). The coordinator 13 includes a processor core 20, which is connected to the first signal line 17. The bus 14 is embodied as a linear bus. The bus 14 can be embodied as a serial bus. The coordinator 13 can be embodied as a master. The subscribers 11, 12 can be embodied as slaves or devices. The processor core 15, 16, 20 can be embodied as a microprocessor.

The bus arrangement 10 includes a first subscriber arrangement 23, which includes at least the second subscriber 12. It can also include the third subscriber, for example (not shown). The bus arrangement 10 is configured such that the first subscriber arrangement 23 can be decoupled from the bus 14 in an operating phase B. On the other hand, the bus arrangement 10 is not configured such that the first subscriber 11 can be decoupled from the bus 14 in an operating phase B, at least not without triggering a first error message and/or the switching-off of the bus arrangement 10.

The processor core 20 of the coordinator 13 is connected via a signal line circuit 31 of the coordinator 13 to the first signal line 17. Furthermore, the processor core 15 of the first subscriber 11 is connected via a signal line circuit 32 of the first subscriber 11 to the first and the second signal lines 17, 18. The processor core 16 of the second subscriber 12 is connected via a signal line circuit 33 of the second subscriber 12 to the second and, if present, also to the third signal line 18, 19.

Moreover, the bus 14 includes at least one bus line 21 that connects the coordinator 13 to all subscribers and thus to the first and second subscribers 11, 12. A signal on the at least one bus line 21 reaches all subscribers 11, 12. The bus 14 may include an additional bus line 22 connecting the coordinator 13 to all subscribers 11, 12. The at least one bus line 21 and the additional bus line 22 can also be referred to as first and second bus lines. The coordinator 13 includes a transceiver 24 that couples the processor core 20 with the first and second bus lines 21, 22. The first and second subscribers 11, 12 also each include a transceiver 25, 26 with two terminals that are connected to the first and second bus lines 21, 22. In the first and second subscribers 11, 12, the transceiver 25, 26 is coupled with the respective processor core 15, 16. The first and second bus lines 21, 22 as well as the transceivers 24-26 of the coordinator 13 and subscribers 11, 12 can be embodied according to the TIA/EIA-485 A interface standard, also referred to as EIA-485 or RS-485. The transceivers 24-26 of the coordinator 13 and subscribers 11, 12 can be embodied as bus transceivers or as transmit and receive transceivers and be designed for half-duplex operation.

In addition, the bus 14 includes a supply line 27 that connects a power supply 28 of the coordinator 13 to a power supply 29 of the first subscriber 11 and a power supply 30 of the second subscriber 12. Each power supply 28, 29, 30 can be embodied as a voltage regulator.

Furthermore, the first and the second subscribers 11, 12 can each have an application device 35, 36. The application device 35, 36 can be embodied as an actuator, measuring device, or sensor device. The first and second subscribers 11, 12 can thus be embodied as an actuator, measuring device, and/or sensor. The application device 35 of the first subscriber 11 is coupled with the processor core 15 of the first subscriber 11. The same applies to the second subscriber 12. Furthermore, the bus 14 includes a reference potential line 42 that connects a reference potential terminal of the coordinator 13 to reference potential terminals of the first and second subscribers 11, 12. The power supply line 27 and the reference potential line 42 serve to supply power to the subscribers 11, 12 through the coordinator 13.

Moreover, the coordinator 13 includes a memory 53 that is connected to the processor core 20 or microcontroller 34 of the coordinator 13. The memory 53 can be embodied as a non-volatile semi-permanent memory. Furthermore, the coordinator 13 includes a volatile memory 52. The first subscriber 11 includes a first volatile memory 54, a first non-volatile permanent memory 55, and a first non-volatile semi-permanent memory 55'. The memories 54, 55 can be connected to the transceiver 25. The second subscriber 12 includes a second volatile memory 56, a second non-volatile permanent memory 57, and a second non-volatile semi-permanent memory 57'. The memories 56, 57 can be connected to the transceiver 26.

The transceiver 25 of the first subscriber 11 recognizes a first subscriber address that is stored in the first volatile memory 54 and a first serial number that is stored in the first non-volatile permanent memory 55, so that the first subscriber 11 processes the data in the telegram. The first subscriber 11 can thus be addressed by a telegram containing only the first subscriber address and data, as well as by a telegram containing only the first serial number and data. The first subscriber 11 can thus be addressed in two ways via the at least one bus line 21. In addition, the first subscriber 11 can also be activated via the first signal line 17. The second subscriber 12 can also identify the second subscriber address that is stored in the second volatile memory 56 and the second serial number that is stored in the second non-volatile permanent memory 57, so that the second subscriber 12 processes the data in the telegram.

The coordinator 13 includes an integrated circuit 45, which can be embodied as an ASIC. The integrated circuit 45 can include the power supply 28, the transceiver 24, the signal line circuit 31, the volatile memory 52, and the processor core 20. Moreover, the first and second subscribers 11, 12 each include an integrated circuit 46, 47, which can be embodied as an ASIC. The integrated circuit 46 of the first subscriber 11 can include the power supply 29, the transceiver 25, the signal line circuit 32, the first volatile memory 54, the first non-volatile permanent memory 55, the first non-volatile semi-permanent memory 55', and the processor core 15. Accordingly, the integrated circuit 47 of the second subscriber 12 can include the power supply 30, the transceiver 26, the signal line circuit 33, the second volatile memory 56, the second non-volatile permanent memory 57, the second non-volatile semi-permanent memory 57', and the processor core 16.

The coordinator 13 includes an additional transceiver 58, which couples an additional bus terminal 59 of the coordinator 13 with the microcontroller 34. The coordinator 13 includes a switch 49. The switch 49 can be embodied as a button. The switch 49 can be actuated by an operator. Furthermore, the bus arrangement 10 includes a fieldbus 60, which is connected to the additional bus connection 59. The coordinator 13 can be a gateway, router, or switch. The coordinator 13 has an oscillator 50. The oscillator 50 can be embodied as an RC oscillator. The oscillator 50 can be used for time control. The coordinator 13 can have a non-volatile permanent memory 51 or an additional memory that is embodied as RAM or flash memory. A control 61 of the bus arrangement 10 can be connected to the fieldbus 60, for example.

The bus 14 is embodied as a ribbon cable or round cable. According to FIG. 1, the bus 14 can consist of five wires, for example. Alternatively, the bus 14 can have a different number of wires, e.g. eight wires. The functionality of the bus arrangement 10 according to FIG. 1 will be explained in greater detail with reference to the following figures.

Figure 2:
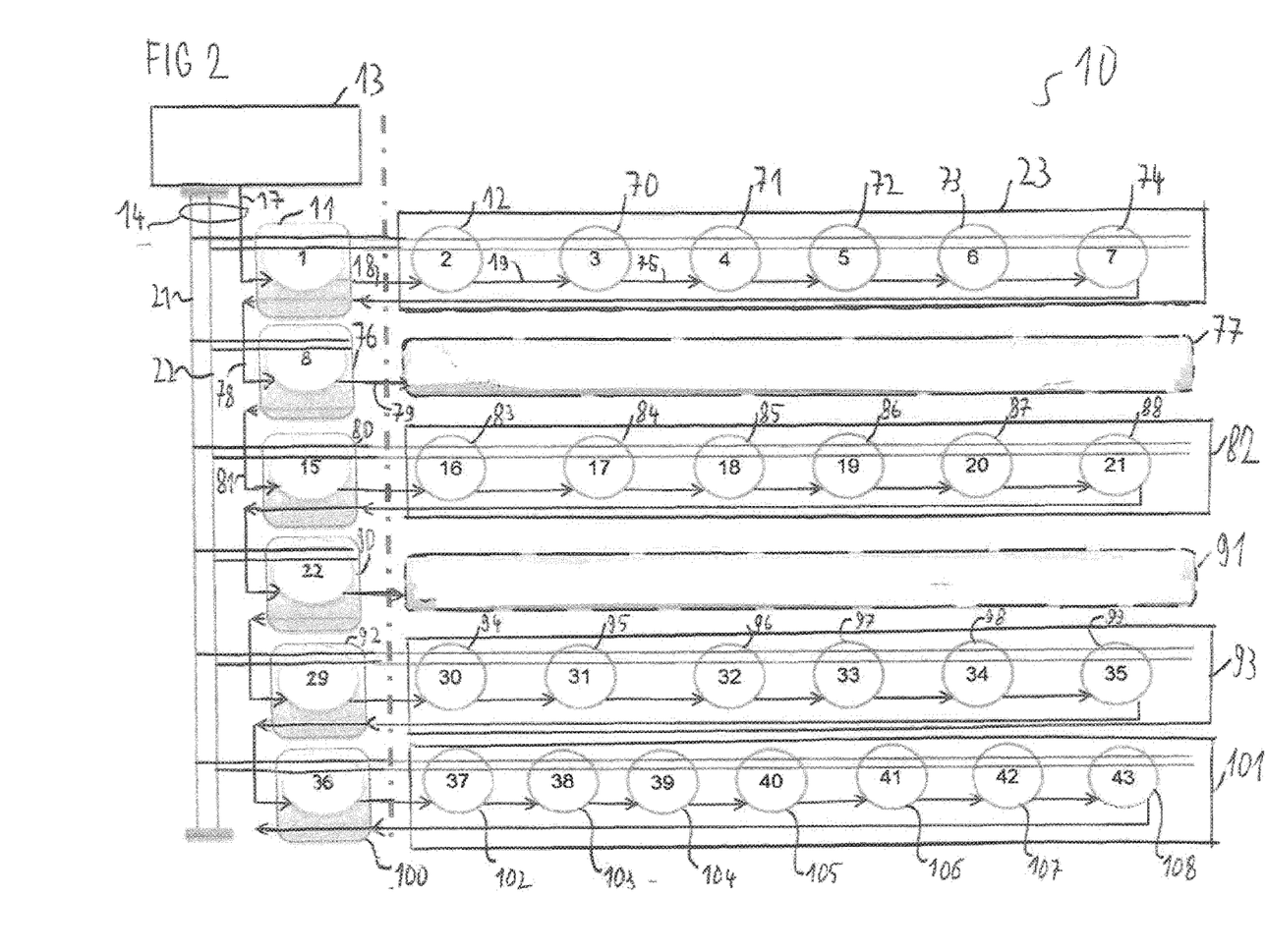

FIG. 2 shows an exemplary embodiment of a bus arrangement 10, which is a development of the bus arrangement shown in FIG. 1. The bus arrangement 10 includes the coordinator 13, the first subscriber 11, and the first subscriber arrangement 23. The first subscriber arrangement 23 includes the second subscriber 12 and a third to a seventh subscriber 70-74. In FIG. 2, the subscriber address is indicated in the respective subscriber. Since the first subscriber 11 is directly and immediately connected to the coordinator 13, the first subscriber 11 bears the first subscriber address "1." Accordingly, the second to seventh subscribers 12, 70-74 bear the subscriber addresses "2" to "7." The coordinator 13 numbers the subscribers 11, 12, 70-74 consecutively.

The at least one bus line 21 and the additional bus line 22 are connected to all subscribers 11, 12, 70-74. Each of the subscribers 11, 12, 70-74 is connected on the input side via a signal line to the preceding subscriber and on the output side via a signal line to the subsequent subscriber. Thus, for example, the third subscriber 70 is connected on the input side via the third signal line 19 to the second subscriber 12 and via a fourth signal line 75 to the fourth subscriber 71.

The bus arrangement 10 further includes an eighth subscriber 76. The eighth subscriber 76 is embodied like the first subscriber 11. The bus arrangement 10 is configured to incorporate an additional subscriber arrangement 77 that can be connected to the eighth subscriber 76. The additional subscriber arrangement 77 is shown in dashed lines. The additional subscriber arrangement 77 that can be connected to the eighth subscriber 76 could have a ninth to a fourteenth subscriber, for example. The eighth subscriber 76 is connected on the input side via a signal line 78 to the output of the seventh subscriber 74. In the state of the bus arrangement 10 that is shown in FIG. 2, the eighth subscriber 76 is not connected to any additional subscriber on the output side via a signal line 79. On the output side, however, a ninth subscriber could be connected to the eighth subscriber 76 via a signal line 79.

Moreover, the bus arrangement 10 includes a fifteenth subscriber 80 whose input could be connected via an additional signal line 81 to the fourteenth subscriber. However, since the additional subscriber arrangement 77 including the ninth through fourteenth subscribers is missing, a gap—also called a daisy chain gap or signal line interruption (selection disruption)—arises between the eighth subscriber 76 and the fifteenth subscriber 80. An additional subscriber arrangement 82 is connected to the fifteenth subscriber 80. The additional subscriber arrangement 82 includes a sixteenth to a twenty-first subscriber 83 to 88. The sixteenth to the twenty-first subscribers 83 to 88 are each connected on the input side via a signal line to the preceding subscriber and on the output side via a signal line to the subsequent subscriber.

Furthermore, the bus arrangement 10 includes a twenty-second subscriber 90, to which an additional subscriber arrangement 91, which includes a twenty-third to a twenty-eighth subscriber, can be connected. The additional subscriber arrangement 91 is absent in the exemplary state of the bus arrangement 10 that is shown in FIG. 2.

Moreover, the bus arrangement 10 shows a twenty-ninth subscriber 92 as well as another additional subscriber arrangement 93 having a thirtieth to a thirty-fifth subscriber 94 to 99, a thirty-sixth subscriber 100, as well as another additional subscriber arrangement 101 having a thirty-seventh to a forty-third subscriber 102 to 108. All of the subscribers of the bus arrangement 10 are connected directly to the at least one bus line 21 and the additional bus line 22. Each of these subscribers can thus be addressed via its subscriber address as soon as the coordinator 13 has assigned its subscriber address to the subscriber in the configuration phase K. Furthermore, each of the subscribers is connected on the input side via a signal line to its preceding subscriber, provided that it is not absent, and is connected on the output side via a signal line to the subsequent subscriber, provided that it is not absent.

The first, eighth, fifteenth, twenty-second, twenty-ninth, and thirty-sixth subscribers 11, 76, 80, 90, 92, 100 cannot be decoupled from the bus 14 in an operating phase B. These subscribers are the so-called permanently mounted (fix-mounted) subscribers. On the other hand, the first subscriber arrangement 23 and the additional subscriber arrangements 77, 82, 91, 93, 101 can be decoupled from the bus 14 in an operating phase B. The subscriber arrangements 23, 77, 82, 91, 93, 101 can be removed and exchanged during operation, meaning that they are hot-pluggable. The subscriber arrangements 23, 77, 82, 91, 93, 101 can also be referred to as drawers.

In an alternative embodiment (not shown), the first subscriber arrangement 23 or one of the additional subscriber arrangements 77, 82, 91, 93, 101 has a different number of subscribers than shown in FIG. 2. For example, the first or one of the additional subscriber arrangements 23, 77, 82, 91, 93, 101 can have at least one subscriber, i.e. the second subscriber 12. Alternatively, the first or one of the additional subscriber arrangements 23, 77, 82, 91, 93, 101 can have at least two subscribers 12, 70.

By means of the addressing method utilizing the unique ASIC serial number that is assigned to each subscriber 11, 12 and thus to each subscriber address, gaps in the daisy chain can be bridged if the configuration was previously read in once in a remanently unchangeable manner in the configuration phase K. The switch 49, also known as the configuration button, can be actuated in order to initiate the configuration phase K. Subscribers behind a select signal gap are also reconnected.

The bus arrangement 10 enables a hot-plugging procedure: during maintenance, new subscribers with new serial numbers can be used and these can be incorporated via the daisy chain in an exchange operating phase.

The bus arrangement 10 is secure even if several subscribers are exchanged and an interruption of the daisy chain is also produced before the exchanged elements. In this case, the coordinator 12 generates an error message and/or puts the bus arrangement 10 into a secure state.

An exchange operating phase, also called replacement mode, provides for the identification of the drawers 23, 77, 82, 91, 93, 101 and their subscribers, which can be exchanged online or offline. Since the drawers 23, 77, 82, 91, 93, 101 with their subscribers and their position in the bus arrangement 10 (i.e. in the cabinet) can be unambiguously determined, good manageability is ensured with a high level of security. In order to enable the beginning of the respective drawer to be determined unambiguously on the bus 14, a subscriber type—e.g. the first subscriber 11—is installed in the power supply branch components and signals this branch position on the bus line. The first subscriber 11 remains permanently installed in the cabinet and can only be exchanged offline and by means of an additional configuration phase K'.

The first subscriber 11 can also be addressed in the exchange operating phase on the basis of the ASIC serial number and thus also be addressed if a draw is pulled in front of it (daisy chain interruption). The pure daisy-chain addressing for the hot-pluggable subscribers of subscriber arrangements 23, 77, 82, 91, 93, 101 can be started separately between these permanently installed subscribers 11, 76, 80, 90, 92, 100.

In addition, the integrated circuit 46 in the first subscriber 11 can measure the outgoing current of the 15 volt bus supply 27, 42 and thus identify whether the first subscriber arrangement 23, i.e. the drawer, to be supplied with power is mechanically plugged in and whether a first attempt to reconnect the first subscriber arrangement 23 is at all worthwhile. The integrated circuit 45 measures the current flowing on the supply line 27 to the first subscriber arrangement 23. If a current is flowing, the coordinator 13 attempts to reactivate the first subscriber arrangement 23. Reconnection can thus be optimized.

In addition, an offline exchange can be performed. The drawers 23, 77, 82, 91, 93, 101 can also be replaced in the shut-down state, that is, they can be not only hot-pluggable online. The bus arrangement 10 is capable of installing and starting the gateway 13 elsewhere (in other cabinet) of compatible structure and recognizing the new subscribers.

After power-up, the exchange mode is detected in the target configuration. The permanently installed subscribers 11, 76, 80, 90, 92, 100 are the first to be checked directly for the serial number. As in the case of online exchanging as well, if all of these special subscribers 11, 76, 80, 90, 92, 100 are present in the desired configuration (cabinet recognition), the reconnection or the compatible exchange of the subscribers for one subscriber arrangement 23 (also called segment or drawer) can be initiated through selection via the daisy chain. The next drawer 23, 77, 82, 91, 93, 101 is then processed by means of the next first drawer subscriber 11, 76, 80, 90, 92, 100.

A startup is also possible with a missing first drawer 23. If the first subscriber 11 cannot be recognized on the bus 14, the coordinator 13 usually goes into a fault state without bus activity that can only be exited via a reset. Once the online exchange has been configured, this final fault state is exited and the recovery process (regain-automat) is (is always) initiated. The coordinator 13 thus begins with the permanently installed first subscribers 11, 76, 80, 90, 92, 100 with serial number addressing and then tries the subscribers 12, 70-74, etc. of the individual drawers 23, 77, 82, 91, 93, 101 in ascending order via the signal lines before starting again at the next drawer branch.

The bus arrangement 10 can perform logical backward addressing by fixed reference point, serial number, and daisy chain control.

In a hot-pluggable bus system 10 in which subscribers can be exchanged, the serial number can no longer be used for the simple bridging of a daisy chain gap. Subscribers behind the gap can no longer be easily addressed without the possibility of confusion and hence vulnerability. Therefore, in the event of a gap in the bus arrangement 10, the geographically nearest permanently installed subscriber—among the subscribers 11, 76, 80, 90, 92, 100, for instance—is used as a starting point for logical backward addressing and attempts to address the subscribers before the geographical starting point by serial number, to check their position by means of signal lines, and only then to activate them. The first subscriber 11 and the subscribers 76, 80, 90, 92, 100 are not hot-pluggable.

The addressing of the subscribers 12, 70-74 of the first subscriber arrangement 23 can also be attempted between two permanently installed non-hot-pluggable subscribers 11, 76 on the basis of a serial number; however, geographical position must be additionally checked by means of the signal lines before the subscribers 12, 70-74 of the first subscriber arrangement 23 may be activated. Addressing can also be performed backward from a starting point, meaning that an attempt is made to address the preceding serial number and set its signal line in order to then also check its real geographical position in the subscriber behind it (fixed in the first pass) by signal line. This can be done backwards from subscriber to subscriber until a signal line gap is reached.

The coordinator 13 knows the permanently installed, non-exchangeable subscribers 11, 76, 80, 90, 92, 100 and, in starting from these, it can not only reinitiate the signal line addressing but also attempt to address them backwards geographically by serial number and to also check their geographical position prior to activation. This makes it possible to check the backward serial number addressing using the daisy chain.

FIG. 3A to 3H show an exemplary embodiment of a bus arrangement 10, which is a development of the embodiments shown in FIGS. 1 and 2. The bus arrangement 10 includes the coordinator 13, the first and the second subscribers 11, 12, as well as a third and a fourth subscriber 70, 71. The first subscriber arrangement 23 includes the second and third subscribers 12, 70. In contrast to FIG. 2, the fourth subscriber 71 is embodied like the first subscriber 11 and cannot be removed during ongoing operation. The coordinator 13 is connected directly to the first subscriber 11 via the first signal line 17. The first subscriber 11 is connected via the second signal line 18 directly to the second subscriber 12. Accordingly, the second subscriber 12 is connected via the third signal line 19 directly to the third subscriber 70. Furthermore, the third subscriber 70 is connected to the fourth subscriber 71 via the fourth signal line 75. The first to the fourth signal lines 17, 18, 19, 75 form a daisy chain. Moreover, the coordinator 13 is connected directly to all subscribers 11, 12, 70, 71 via the at least one bus line 21 and the additional bus line 22, which are also referred to as first and second bus line.

Figure 3A:
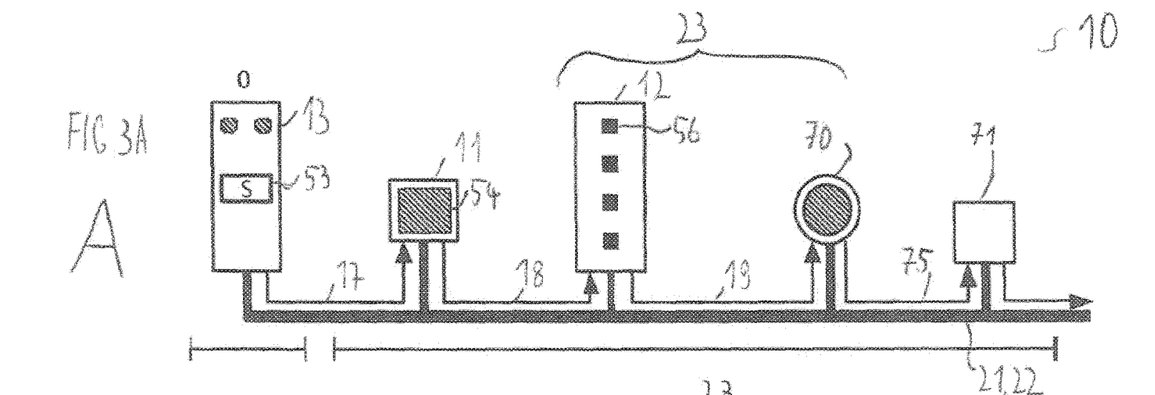
FIGS. 3A to 3H illustrate an embodiment of a bus arrangement in different phases.

In FIG. 3A, the bus arrangement 10 is shown in a shut-down phase A. The shut-down phase A can come before an operating phase B, for example, which begins with a configuration phase K. Alternatively, the switch-off phase A may come before an additional operating phase B', which begins with a restart phase W. The coordinator 13 has an address of 0, for example. No subscriber addresses are stored in the first to fourth subscribers 11, 12, 70, 71. In FIG. 3B to 3E, the subscribers 11, 12, 70, 71 are addressed successively from left to right via the coordinator 13 and with the aid of the daisy chain, and the geographical positions and thus the sequence of the subscribers 11, 12, 70, 71 are established.

In an alternative embodiment that is not shown, the coordinator 13 is coupled with the first subscriber 11 via the first signal line 17 and one or more additional subscribers and one or more additional signal lines.

Figure 3B:
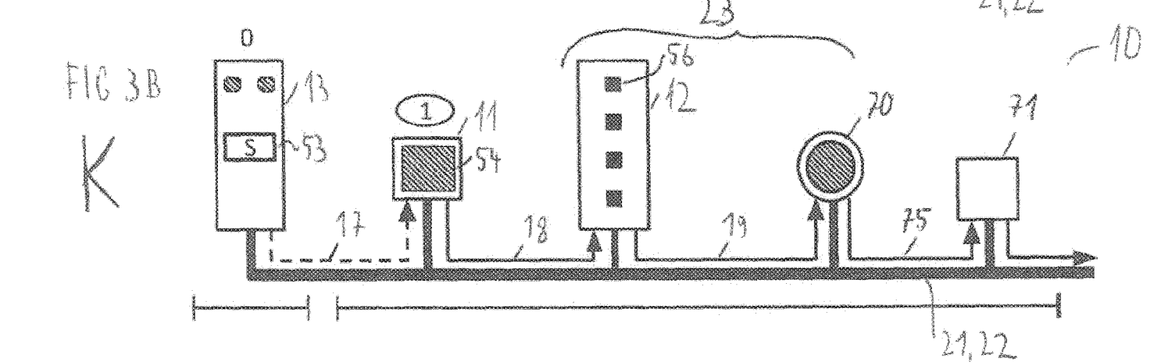

FIG. 3B shows the bus arrangement 10 according to FIG. 3A in the configuration phase K. The coordinator 13 activates the first subscriber 11 via the first signal line 17. To indicate the activation, the first signal line 17 is shown in dashed lines. After activation, the coordinator 13 transmits a telegram containing a first subscriber address to all subscribers 11, 12, 70, 71 via the first and second bus lines 21, 22. Only the activated subscriber, namely the first subscriber 11, incorporates the first subscriber address contained in the telegram into its volatile memory 54. The first subscriber address can be 1.

As explained, the coordinator 13 sets its daisy chain and transmits the subscriber address 1 to be assigned as a broadcast via the RS-485 bus line/data line 21, 22 of the bus 14 to all subscribers 11, 12, 70, 71. At this point in time, only the daisy chain is active at the first subscriber 11, for which reason it interprets subscriber address with the number 1 received from the coordinator 13 as being its own. From this point forward, the first subscriber 11 can receive bus messages with the previously received subscriber address.

Figure 3C:
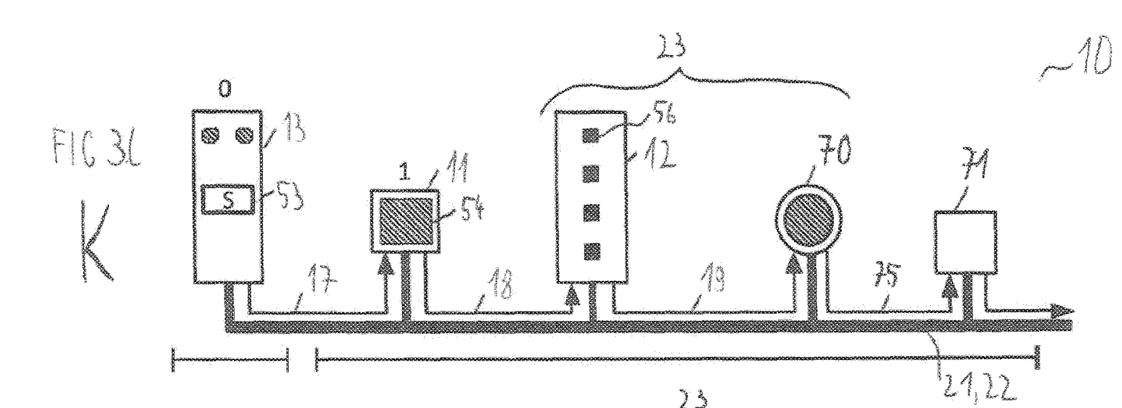

FIG. 3C shows the bus arrangement 10 that was already shown in FIGS. 3A and 3B in an additional step of the configuration phase K. The coordinator 13 establishes a connection to the first subscriber 1 via the first and second bus lines 21, 22 in order to read out a first serial number of the first subscriber 11. For this purpose, the coordinator 13 transmits a telegram to the first subscriber address that includes the command to provide the serial number. The transceiver 25 of the first subscriber 11 recognizes that the first subscriber 11 is being addressed and causes the processor core 15 of the first subscriber 11 to transmit, via the first and second bus lines 21, 22, the first serial number to the coordinator 13, which stores it in the non-volatile semi-permanent memory 53. As a result, the first subscriber 11 is registered in the coordinator 13.

In FIG. 3C, the coordinator 13 is able to establish a connection to the first subscriber 11 and to retrieve its data. Among other things, the first serial number is read out and linked in the coordinator 13 with the associated first subscriber address and remanently stored. The daisy chain is reset.

Figure 3D:
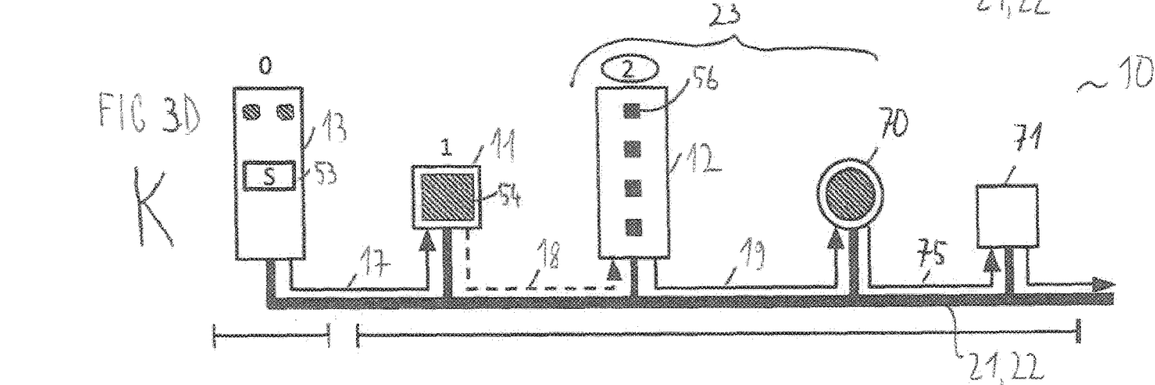

FIG. 3D shows the bus arrangement 10 that is already shown in FIG. 3A to 3C in an additional step in the configuration phase K. The coordinator 13 transmits a telegram to the first subscriber 11 with the command to activate the output-side signal line, i.e. the second signal line 18. The first subscriber 11 detects by means of its transceiver 25 that it is being addressed and activates the second subscriber 12 via a signal on the second signal line 18. Subsequently, the coordinator 13 transmits a telegram to all subscribers 11, 12, 70, 71 that contains the second subscriber address, e.g. 2. However, since only the second subscriber 12 is activated, only the second subscriber 12 incorporates the second subscriber address into its volatile memory 56. As an additional step in the configuration phase K, the coordinator 13 causes the second subscriber 12 to make the second serial number available. The second subscriber 12 is registered by storing the second serial number in the non-volatile semi-permanent memory 53 of the coordinator 13.

In FIG. 3D, the first subscriber 11 receives the order to set its daisy chain so that the addressing can be continued. The coordinator 13 sends a broadcast with the subscriber address 2 included. This procedure is carried out by the coordinator 13 until all subscribers have been assigned a subscriber address. Consequently, the third subscriber 70 is activated and assigned a third subscriber address—3, for instance—and a third serial number of the third subscriber 70 is retrieved. The fourth subscriber 71 carries out corresponding steps.

Figure 3E:
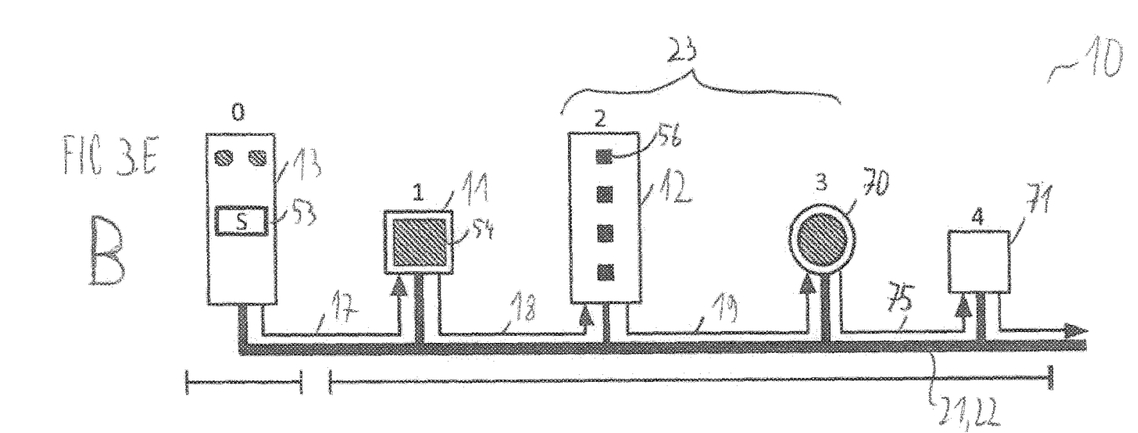

FIG. 3E shows the bus arrangement 10 that is already shown in FIG. 3A to 3D in the operating phase after completion of the configuration phase K. The coordinator 13 is now able to address all subscribers 11, 12, 70, 71 via the subscriber addresses. The addressed subscribers 11, 12, 70, 71 are stored remanently in the coordinator 13 together with parameter and configuration data (serial numbers, vendor identity). Previously identified subscribers 11, 12, 70, 71 can be addressed again by the coordinator 13 by their unique serial number even after malfunctions. The addressed subscribers 11, 12, 70, 71 do not remanently store their subscriber addresses, behaving again as in the beginning (like in FIG. 3A, for example) after another power-up.

Figure 3F:
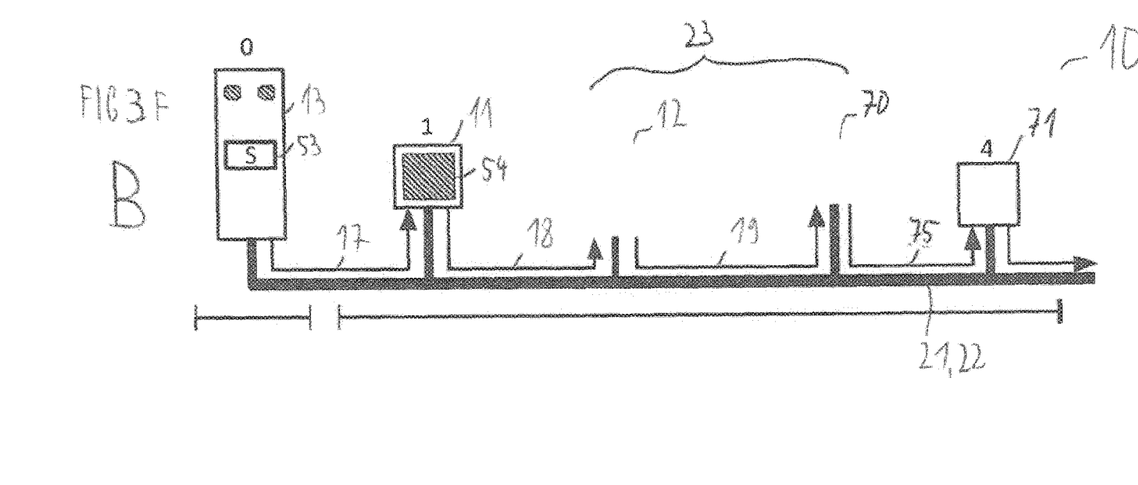

FIG. 3F shows the bus arrangement 10 that is already illustrated in FIG. 3A to 3E in the operating phase B. Subscribers can drop out in the operating phase B. In the example shown in FIG. 3F, the second and third subscribers 12, 70 have malfunctioned. The coordinator 13 is still able to send telegrams to the subscribers 11, 71 that have not malfunctioned via the first and second bus lines 21, 22 and to control the subscribers 11, 71 that have not malfunctioned or to retrieve their data. The coordinator 13 detects the malfunctioning of the subscribers—in this case, the second and third subscribers 12, 70—and stores information regarding the malfunction of the malfunctioning subscribers 12, 70 in the non-volatile semi-permanent memory 53, registering them as having malfunctioned.

The bus arrangement 10 continues even after the malfunctioning of subscribers 12, 70. The coordinator 13 assumes the role of the malfunctioning subscribers 12, 70. The volatile memory 54, 56 of the malfunctioning subscriber(s) 12, 70 generally loses its subscriber address during the failure.

The coordinator 13 is configured so as to reactivate one or more malfunctioning subscribers acyclically or at predetermined times, for example. A malfunctioning subscriber can be repaired in a shut-down phase A, for example. In one embodiment, the malfunctioning subscriber can also be removed in an operating phase B and used again after repair. This procedure is called hot-plugging.

Figure 3G:
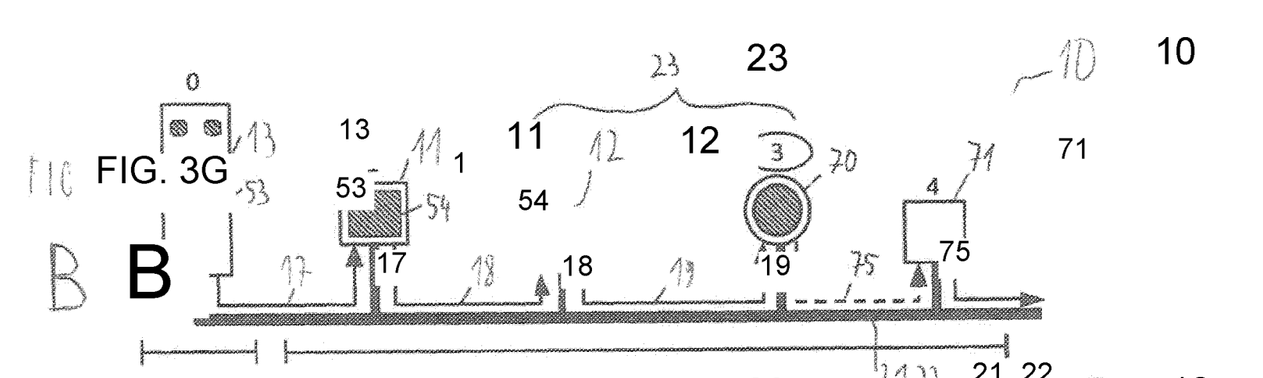

FIG. 3G shows the exemplary bus arrangement 10 as already shown in FIG. 3A to 3F in a part of the operating phase B. As shown in FIG. 3F, two subscribers—namely, the second and third subscribers 12, 70—have dropped out. Only the third subscriber 70 is available again and is to be reconnected. For the purpose of activation, the coordinator 13 transmits a message via the first and second bus lines 21, 22 with the serial number of the malfunctioning subscriber, i.e. with the serial number of the third subscriber 70. For example, the third subscriber 70 can confirm receipt of the message to the coordinator 13. The coordinator 70 transmits a telegram to the malfunctioning subscriber 70 with the command that it output a signal on its output-side signal line to the subsequent subscriber 71.

In the example of FIG. 3G, the third subscriber 70 transmits a signal to the fourth subscriber 71 via the fourth signal line 75. The subscriber 71 that is on the bus 14 after the malfunctioning subscriber 70 transmits its activation to the coordinator 13. The coordinator 13 transmits the third subscriber address to the third subscriber 70, for example by means of a telegram that is addressed to the third serial number. This ensures that the subscriber that has the third serial number is not secured just anywhere on the bus 14 when it is switched back on, but rather at the correct location, namely immediately before the fourth subscriber 71.

The fourth subscriber 71 is a permanently installed subscriber. Since its location on the bus is unique, it is ensured through the use of the third serial number that the correct subscriber is installed at the position of the third subscriber 70.

As described above, recurrent subscribers 70 can be addressed by the coordinator 13 based on the unique serial number even without a daisy chain. However, the daisy chain of the detected subscriber 70 is then used as an aid in determining the geographical positions. Thus, after activation of the daisy chain from the third subscriber 70 to the fourth subscriber 71, the geographical location of the third subscriber 70 can be confirmed again.

Figure 3H:
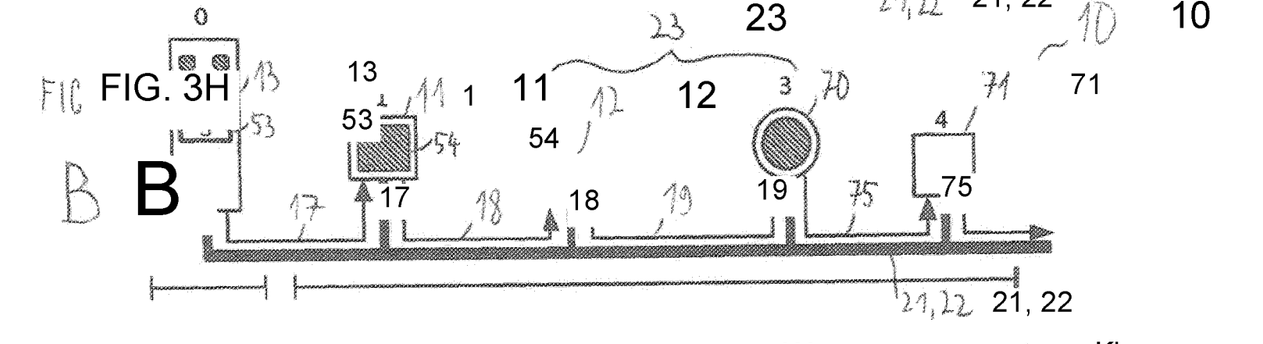

FIG. 3H shows the bus arrangement 10 that is already shown in FIG. 3A to 3G after execution of the steps illustrated by FIG. 3G. The third subscriber 70 has now received its subscriber address 3 back and can be reintegrated into the bus arrangement 10. The coordinator 13 stores information in its non-volatile semi-permanent memory 53 that the third subscriber 70 is active.

Figure 4:
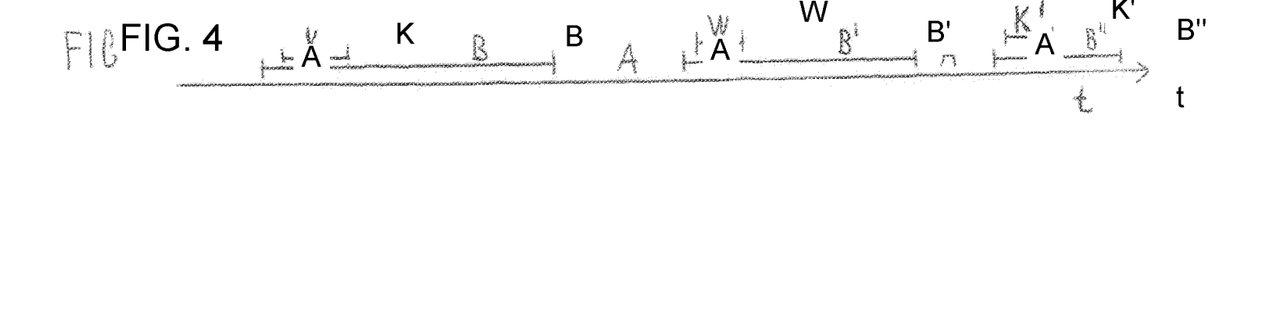
FIG. 4 illustrates an exemplary chronological sequence of phases in a bus arrangement.

FIG. 4 shows an exemplary embodiment of the chronological sequence of the phases. The different phases are plotted over a time t. The configuration phase K is carried out at the beginning of the operating phase B. After the coordination phase K has been carried out, for example, regular operation of the bus arrangement 10 is carried out in the operating phase B. The operating phase B is followed by a shut-down phase A. In the shut-down phase A, the coordinator 13 and the subscribers 11, 12 are not supplied with electric power. The shut-down phase A is followed by an additional operating phase B'. At the beginning of the additional operating phase B', a restart phase W is carried out. After the restart phase W, the regular operation of the bus arrangement 10 is carried out in the additional operating phase B'. The additional operating phase B' can be followed by additional shut-down phases A and additional operating phases B".

One of the additional operating phases B" can begin with an additional configuration phase K', for example. For example, an operator can reset the bus arrangement 10 by means of the switch 49 of the coordinator 13, so that the bus arrangement 10 starts with the additional configuration phase K'.

The malfunctioning of subscribers and the activation of subscribers illustrated in FIG. 3F to 3G can occur in each of the operating phases B, B', B".

In the restart phase W, the coordinator 13 carries out steps to assign the subscriber addresses to the subscribers that are similar to those carried out in the configuration phase K. In addition, the coordinator 13 performs a comparison of the serial numbers retrieved in the restart phase W with the serial numbers stored in its non-volatile semi-permanent memory 53.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

THE FOLLOWING IS A LIST OF REFERENCE NUMERALS 10 arrangement
11 first subscriber
12 second subscriber
13 coordinator
14 bus
15, 16 processor core
17 first signal line
18 second signal line
19 third signal line
20 processor core
21 at least one bus line
22 additional bus line
23 first subscriber arrangement
24, 25, 26 transceiver
27 power supply line
28, 29, 30 power supply
31, 32, 33 signal line circuit
34 microcontroller
35, 36 application device
42 reference potential line
45, 46, 47 integrated circuit
49 switch
50 oscillator
51 non-volatile permanent memory
52 volatile memory
53 non-volatile semi-permanent memory 54 first volatile memory
55 first non-volatile permanent memory
55' first non-volatile semi-permanent memory
56 second volatile memory
57 second non-volatile permanent memory
57' second non-volatile semi-permanent memory
58 additional transceiver
59 additional bus connection
60 fieldbus
70-74 subscribers
75 signal line
76 subscriber
77 additional subscriber arrangement
78, 79 signal line
80, 83-88 subscribers
81 signal line
82 additional subscriber arrangement
90 subscriber
91 subscriber arrangement
92, 94-99 subscribers
93 another additional subscriber arrangement
100, 102-108 subscribers
101 another additional subscriber arrangement
A shut-down phase
B, B', B" operating phase
K configuration phase
K' additional configuration phase
t time
W, W' restart phase

The invention claimed is:

1. A bus arrangement, the bus arrangement comprising:
a coordinator;
a first subscriber;
a subscriber arrangement comprising a second subscriber; and
a bus coupling the coordinator with the first subscriber and the second subscriber, the first subscriber being arranged between the coordinator and the second subscriber on the bus,
wherein the bus arrangement is configured such that the subscriber arrangement can be decoupled from the bus in an operating phase, and such that the first subscriber cannot be decoupled from the bus in the operating phase.

2. The bus arrangement according to claim 1,
wherein the coordinator is coupled to the bus at one end of the bus,
wherein the first subscriber is coupled to the bus at a point downstream of the end of the bus where the coordinator is coupled, and
wherein the second subscriber is coupled to the bus at a point of the bus downstream of the point where the first subscriber is coupled to the bus.

3. The bus arrangement according to claim 1, wherein the subscriber arrangement comprises the second subscriber and at least one other subscriber.

4. The bus arrangement according to claim 1, wherein the subscriber arrangement is hot-pluggable and the first subscriber is not hot-pluggable.

5. The bus arrangement according to claim 1, wherein the first subscriber and the subscriber arrangement are mechanically intercoupled such that the subscriber arrangement is decoupleable from and coupleable to the bus without removal of the first subscriber and the first subscriber is not decoupleable from the bus without removal of the subscriber arrangement.

6. The bus arrangement according to claim 1, wherein the first subscriber is a control branch and comprises a power supply, independent from a power supply of the coordinator, the power supply of the first subscriber configured to supply power to the subscriber arrangement.

7. The bus arrangement according to claim 1, wherein the bus comprises a first signal line that directly couples the first subscriber and the coordinator and comprises a second signal line that directly couples the second subscriber to the first subscriber.

8. The bus arrangement according to claim 7, wherein the bus comprises at least one bus line that couples the coordinator to the first subscriber and the second subscriber.

9. The bus arrangement according to claim 7, wherein the coordinator is indirectly coupled to the second signal line via the first subscriber.

10. The bus arrangement according to claim 1, wherein the second subscriber comprises an actuator, a measuring device, or a sensor.

11. The bus arrangement according to claim 1, wherein the subscriber arrangement is configured as a drawer or sliding box.

12. The bus arrangement according to claim 11, wherein the second subscriber is contained within the drawer or the sliding box.

13. The bus arrangement according to claim 11, the bus arrangement comprising a cabinet, which contains the first subscriber and the subscriber arrangement, wherein the subscriber arrangement is configured to be pulled out of and reinserted into the cabinet.

14. The bus arrangement according to claim 11,
wherein the subscriber bus arrangement comprises the second subscriber and a third subscriber,
wherein the second subscriber and the third subscriber are contained within the drawer or the sliding box, and
wherein the first subscriber and second subscriber are arranged physically within the drawer of the sliding box according to an address sequence.

15. The bus arrangement according to claim 1, wherein the coordinator is configured to perform automatic addressing of a plurality of subscribers, which comprises the first subscriber and second subscriber, according to a physical arrangement of subscribers on the bus.

16. A method for operating a bus arrangement comprising a coordinator; a bus, a first subscriber; and a subscriber arrangement with a second subscriber, the bus coupling the coordinator with the first subscriber and the second subscriber, the first subscriber being arranged between the coordinator and the second subscriber on the bus, the method comprising:
decoupling the subscriber arrangement from the bus during an operating phase while the coordinator continues to operate the bus arrangement; and
upon decoupling of the first subscriber from the bus in the operating phase, outputting, by the coordinator, a first error message and/or putting, by the coordinator, the bus arrangement into a secure state.

17. The bus arrangement according to claim 1, wherein the coordinator is separate from the first subscriber and the second subscriber, and the coordinator is in communication with the first subscriber and the second subscriber.

18. The bus arrangement according to claim 1, wherein the coordinator further comprises a processor core.

19. The bus arrangement according to claim 3,
wherein the subscriber arrangement further comprises a final subscriber, wherein the final subscriber of the subscriber arrangement is connected via a signal line to a subsequent subscriber, and wherein the subsequent subscriber cannot be decoupled from the bus in the operating phase.

20. The bus arrangement according to claim 7, wherein the signal lines provide information on a geographical location of an installed subscriber.

\* \* \* \* \*